3,201,326
PROCESS FOR PREPARING LYSERGIC ACID
Alba Maria Amici, Anacleto Minghetti, and Celestino Spalla, Milan, and Antonio Tonolo, Rome, Italy, assignors to Società Farmaceutici Italia, Milan, Italy, an Italian corporation
No Drawing. Filed July 9, 1963, Ser. No. 293,872
Claims priority, application Italy, July 12, 1962, 13,934/62
4 Claims. (Cl. 195—81)

Our invention relates to the production of lysergic acid.
An object of our invention is a microbiological process for the preparation of lysergic acid starting from lysergamide or isolysergamide by employing *Claviceps purpurea* (Fr.) Tul.

It is known that lysergic acid is prepared by alkaline hydrolysis either of the ergot alkaloids (J. Biol. Chem. 104, 1934, p. 547) or of the lysergic acid amide (J. Chem. Soc. 1934, p. 674, and 1936, p. 1540) with transformation yields of 30–50%.

We have found that *Claviceps purpurea* (Fr.) Tul. is able to hydrolyze the amidic group of lysergamide or isolysergamide to a free carboxylic group. The process of our invention permits transformation yields of better than 90%.

The process of the invention, which will be illustrated in detail hereinafter, consists in submitting a compound selected from the group consisting of lysergamide and isolysergamide, dissolved in a suitable organic solvent, such as dimethylformamide and ethanol, to the enzymatic action of *Claviceps purpurea* (Fr.) Tul., cultivated in suitable culture media. The amide may be added directly to the culture broth or to the mycelium separated from the fermentation broths and suspended in a weakly acid buffer solution.

The culture media contain a carbon source, nitrogen source and mineral salts. The carbon source consists of starch, mannite, sorbite, saccharose, glucose, maltose, glycerine, succinic acid, vegetable oils, cereal flour or other substances generally employed. The nitrogen source, besides the above cited complex substances containing nitrogen, may consist of casein, ammonia salts, peptones, meat and fish flour or other substances usually employed. The inorganic salts may be sulfates, phosphates and sodium chlorides, potassium, magnesium, zinc, manganese, iron and copper and other salts usually employed.

The organism is cultured in aerobic and submerged culture, in flasks or fermenters at a temperature of from 20 to 28° C., preferably 24° C. The pH of the culture medium should range between 4.5 and 7.0, preferably 5.2. At this point, the lysergic or isolysergic acid amide dissolved in an organic solvent, such as dimethylformamide and ethanol, is added to the culture broth and incubated over a period of 5–10 days at a temperature of from 20° to 40° C. or it is added to the mycelium, which is separated from the culture broth and suspended in an acid buffer solution, such as a slightly acid phosphate or citrate solution. In this case, the mycelium is separated by filtering or centrifuging, optionally dried in vacuo, and suspended in buffer solution at a pH of from 5 to 5.5, preferably a 0.05 phosphate buffer at a pH of 5.2. To the suspension, the starting amide solution is added and incubated over a period ranging from 1 to 8 days at a temperature of from 20 to 40° C., preferably 37° C.

The transformation of the lysergic or isolysergic acid amide into the corresponding lysergic acid is checked by known chemical or chromatographic analyses. When the incubation period is over, the lysergic acid obtained is isolated by extraction processes. It is preferably carried out in the following manner. The fermentation broth is filtered and the filtrate, brought up to pH 4.5 to 5.5, is repeatedly extracted with an organic solvent, such as n-butanol. The extracts collected are concentrated in vacuo and the residue is washed with an organic solvent in which lysergic acid is insoluble, such as ethyl ether, and thereafter dissolved in a diluted aqueous ammonia solution. From the solution thus obtained, decolored and filtered with active carbon and afterwards concentrated to small volume in vacuo, lysergic acid crystallizes.

The following examples serve to illustrate, but are not intended to limit, the present invention.

Example I

A culture of *Claviceps purpurea* (Fr.) Tul. aged from 7 to 10 days in test tubes containing glucose-potatoagar is inoculated into two 300-cc. Erlenmeyer flasks each containing 60 cc. of the following vegetative medium:

|  | Percent |
|---|---|
| Mannite | 5 |
| Succinic acid | 1 |
| $KH_2PO_4$ | 0.1 |
| $MgSO_4 \cdot 7H_2O$ | 0.03 |
| Chick-pea flour | 0.1 |
| $FeSO_4 \cdot 7H_2O$ | 0.001 |
| $ZnSO_4 \cdot 7H_2O$ | 0.001 |
| $MnSO_4 \cdot 4H_2O$ | 0.0001 |
| Tap water | Balance | pH brought to 5.2 with $NH_4OH$. Sterilization at 120° C. for 20 minutes.

The flasks are incubated at 24° C. for 7 days on a rotating shaker with a range of 6 cm. at 220 r.p.m. The culture broths thus obtained serve to inoculate eight 300-cc. flasks each containing 60 cc. of the following nutritive medium for production:

|  | Percent |
|---|---|
| Mannite | 5 |
| Succinic acid | 3 |
| $KH_2PO_4$ | 0.1 |
| $MgSO_4 \cdot 7H_2O$ | 0.03 |
| $FeSO_4 \cdot 7H_2O$ | 0.001 |
| $ZnSO_4 \cdot 7H_2O$ | 0.001 |
| $MnSO_4 \cdot 4H_2O$ | 0.0001 |
| Tap water | Balance | pH brought to 5.2 with $NH_4OH$. Sterilization at 120° C. for 20 minutes.

Each flask inoculated with 6 cc. of said vegetative medium is incubated for 6 days at 24° C. on a shaker similar to that described above. 480 mg. of isolysergic acid amide are dissolved in 4 cc. of dimethylformamide. 60 mg. of this isolysergic acid amide solution are added to each flask. After 7 days of incubation at 24° C., the cultures are collected and filtered. 31 cc. of the filtered broth are withdrawn in order to check the content of the lysergic acid. The checking is carried out as follows: 10 cc. of the broth are made alkaline with a dilute alkali hydroxide or carbonate solution to about pH 11. The extraneous alkaline substances are removed by extracting with chloroform and the lysergic acid is titrated in the aqueous phase with the method of Voigt (Microchim. Acta 1959, p. 619). The titer of the lysergic acid is 554γ per cc. of lysergic acid monohydrate. The filtered culture broth is brought to pH 5 with 5% $H_2SO_4$ and twice extracted with 250 cc. of n-butanol. The butanol extracts collected and clarified by centrifuging are concentrated in vacuo until a solid residue weighing 1.210 g. is obtained. The residue is washed with ethyl ether and taken up with 50 cc. of water and 5 cc. of concentrated ammonium hydroxide solution. The opalescent solution obtained is partially decolored by three treatments at 60–70° C. each with 20 mg. of active charcoal followed by filtration through a cake of 100 mg. of active charcoal. The filtrate is evaporated in vacuo to 12 cc. and kept in a refrigerator overnight. The crystals of the lysergic acid monohydrate which precipitate are collected and dried over calcium chloride. They weigh 125 mg.; melt at 224° C. (with decomposition). $[\alpha]_D^{20°}=+37.4$ (c.=0.5 in pyridine).

*Example 2*

The preparation is carried out as in Example 1, except that the alkaloid added to the culture broth is the lysergic acid amide. A transformation of 80% is obtained.

*Example 3*

The preparation is carried out as in Example 1, except that the nutritive production medium used has the following composition:

| | Percent |
|---|---|
| Sorbite | 5 |
| Succinic acid | 3 |
| $KH_2PO_4$ | 0.1 |
| $MgSO_4.7H_2O$ | 0.03 |
| $FeSO_4.7H_2O$ | 0.001 |
| $ZnSO_4.7H_2O$ | 0.001 |
| $MnSO_4.4H_2O$ | 0.0001 |
| Tap water | Balance | pH adjusted to 5.2 (by $NH_4OH$). A yield of lysergic acid of 55% is obtained.

*Example 4*

The preparation is carried out as in Example 1, with the exception that before introducing the alkaloid, the mycelium is collected by centrifuging and suspended in an 0.05 M phosphate buffer at 5.4 pH in order to obtain half of the original volume. 20 mg. of the isolysergic acid amide dissolved in 0.5 cc. of dimethylformamide are then added to each flask; the incubation is continued for 120 hours. Transformation yields of 65% of lysergic acid are obtained.

*Example 5*

The preparation is carried out as in Example 1, with the exception that after addition of the alkaloid, the culture broths are incubated at 37° C. rather than at 24°. Yields of 95% of lysergic acid are obtained.

*Example 6*

The mycelium is cultivated as in Example 1. At 6 days of age, 4 flasks are filtered and the mycelium is washed on the filter for three times with 100 cc. of water each time and suspended in 500 cc. of anhydrous acetone previously cooled to −10° C. After filtering the acetone suspension, the residue is washed twice on the filter with 100 cc. of cold acetone and dried in vacuo. 3.600 grams of dry powder are obtained. 900 mg. of said powder are suspended in 10 cc. of 0.2 M phosphate buffer at 5.2 pH to which 10 mg. of lysergic acid amide, dissolved in 0.2 cc. of dimethylformamide, are added. After 120 hours of incubation at 37° C., a transformation in lysergic acid higher than 95% is obtained.

*Example 7*

The mycelium is cultivated as described in Example 1. At 6 days of age, 4 flasks are filtered and the mycelium is washed on the filter for three times with 100 cc. of cold water each time. The cake is cooled to −20° C., then thawed and comminuted in a flask with 5 g. of glass powder for 15 minutes. 10 cc. of citrate buffer at 5.2 pH is added. 20 cc. of an analogous citrate buffer is added and the whole centrifuged at a rate of 5000 r.p.m. for 30 minutes. All the steps are carried out at about 0° C. To 4 cc. of the solution, 1 cc. of buffer solution at 5.2 pH, 5 cc. of $H_2O$ and 10 mg. of lysergic acid amide in 0.2 cc. of dimethylformamide are added. After 120 hours of incubation at 24° C., a transformation in lysergic acid of 55% is obtained.

*Example 8*

3 liters of the vegetative medium as in Example 1 are sterilized at 120° C. for 60 minutes in a 5-liter laboratory fermenter and inoculated with 300 cc. of culture broth obtained in a flask on vegetative medium as described in Example 1. The resulting solution is incubated for 7 days at 24° C. under aeration with a 4-paddle propeller at 300 r.p.m. and an aeration rate of 3 liters per minute. 3 liters of the production medium as reported in Example 1 are sterilized in a 5-liter laboratory fermenter and inoculated with 300 cc. of culture broth obtained as described above. The aeration conditions are the stirring with a 4-paddle propeller at a rate of 400 r.p.m. and an aeration rate of 3 liters per minute. After 4 days of incubation, 3 g. of isolysergic acid amide dissolved in 25 cc. of dimethylformamide are added and the incubation is carried on at 37° C. for 5 days. Transformation yields in lysergic acid of 85% are obtained.

We claim:
1. A microbiological process for the preparation of lysergic acid, which comprises submitting a compound selected from the group consisting of lysergamide and isolysergamide, dissolved in an organic solvent, selected from the group consisting of dimethylformamide and ethanol, to the enzymatic action of *Claviceps purpurea* (Fr.) Tul. under aerobic conditions and isolating the lysergic acid thus obtained, by extraction with an organic solvent selected from the group consisting of chloroform and n-butanol.

2. A microbiological process for the preparation of lysergic acid, which comprises adding a compound selected from the group consisting of lysergamide and isolysergamide, dissolved in an organic solvent selected from the group consisting of dimethylformamide and ethanol, to a culture broth containing *Claviceps purpurea* (Fr.) Tul. incubated at a temperature ranging from 20° to 40° C. and at a pH from 4.5 to 7.0.

3. A microbiological process for the preparation of lysergic acid, which comprises adding a compound selected from the group consisting of lysergamide and isolysergamide, dissolved in an organic solvent selected from the group consisting of dimethylformamide and ethanol, to the filtered mycelium of *Claviceps purpurea* (Fr.) Tul. suspended in an acid buffer solution at a pH from 5 to 5.5 and incubated at a temperature of from 20° to 40° C. and a pH from 4.5 to 7.0.

4. A microbiological process for preparing lysergic acid, which comprises adding a compound selected from the group consisting of lysergamide and isolysergamide, dissolved in a solvent selected from the group consisting of dimethylformamide and ethanol, to the filtered mycelium of *Claviceps purpurea* (Fr.) Tul. suspended in a phosphate buffer solution at a pH from 5 to 5.5 and incubated at a temperature of about 37° C. and a pH of about 5.2.

References Cited by the Examiner

UNITED STATES PATENTS

| | | | |
|---|---|---|---|
| 3,060,104 | 10/62 | Chain et al. | 195—81 |
| 3,110,651 | 11/63 | Kybal et al. | 195—81 |
| 3,117,917 | 1/64 | Adams | 195—81 |

A. LOUIS MONACELL, *Primary Examiner.*